United States Patent [19]

Gaines

[11] 4,174,087
[45] Nov. 13, 1979

[54] SWIVEL SUSPENSION SET

[75] Inventor: Stanley Gaines, Roslyn Heights, N.Y.

[73] Assignee: Allen-Stevens Corp., Woodside, N.Y.

[21] Appl. No.: 883,198

[22] Filed: Mar. 3, 1978

[51] Int. Cl.² ............................................. F16B 45/00
[52] U.S. Cl. ................................................... 248/339
[58] Field of Search ..................... 248/225.1, 318, 323, 248/339, 342, 343

[56] References Cited

U.S. PATENT DOCUMENTS

| 961,050 | 6/1910 | Wakefield | 248/343 |
|---|---|---|---|
| 2,882,005 | 4/1959 | Ramsing | 248/343 |
| 3,995,822 | 12/1976 | Einhorn | 248/339 X |

FOREIGN PATENT DOCUMENTS 1131598  6/1962  Fed. Rep. of Germany ........... 248/339

Primary Examiner—William H. Schultz
Attorney, Agent, or Firm—Kirschstein, Kirschstein, Ottinger & Cobrin

[57] ABSTRACT

An overhead swivel suspension set that consists of a mount and a support, i.e. a grab. The set when assembled is used to hang an object, e.g. a floral display or an electric light fixture, from a ceiling or the like. The mount includes a base adapted to be secured to a ceiling, and a horizontal ring held below the base by pendant legs. The base, the legs and the ring are die cast as a single piece. The opening through the ring constitutes a vertical bearing. The upper surface of the ring serves as a horizontal step bearing. The ring is gapped over an arc of considerably less than 180° to provide a radial slot. The support comprises a journal with a grab, e.g. a hook, at its lower end, and an enlarged head at its upper end. The journal, the grab and the head are die cast as a single piece. The journal is rotatable in the opening through the ring so that it can turn about a vertical axis in the mount. The diameter of the journal is greater than the width of the gap. The head rests on the upper surface of the ring. The grab is below the ring. The top of the grab has one transverse dimension narrower than the gap. To connect the support with the mount said narrower dimension of the upper end of the grab is slid through the gap until the journal is centered over the bore, then the journal is dropped into the bore until the head rests on the ring. This locks the support to the ring because the journal is larger than the gap. Such arrangement enables the swivel set to be of a very low height, this including the conjoint heights of the grab, the base, the ring, the journal and the head.

7 Claims, 7 Drawing Figures

SWIVEL SUSPENSION SET

BACKGROUND OF THE INVENTION

1. Field of the Invention

A swivel device for hanging objects overhead.

2. Description of the Prior Art

Previous swivel devices for suspending objects, although inexpensive, have been esthetically unattractive and did not permit ready adjustment of the angular orientation of pendant objects. Moreover, they could not be removed without leaving unsightly marks.

One previous device of this character was composed of three parts. The first part was firmly attached to the ceiling and had a vertical bearing in which a journal of the second part could rotate. Both of these parts were made in a relatively expensive process employing but a single mold the rotatable part of which had an undercut wedge-shaped channel into which a dovetailed base wedge of the third part could be introduced horizontally. Aside from the expense of fabricating such a device, it was dangerous because the third part could slide out of the channel accidentally. The device was excessively high so that it would not lie unobstrusively against the ceiling when the third part was removed. It was cumbersome to operate and install and was quite bulky.

Another prior art device of this character included a first part that was attached to a ceiling and was permanently secured to an ungapped horizontal ring. A hook was threaded through the ring until its enlarged base rested on the ring to inhibit further downward movement. Due to the need to provide sufficient space to thread the hook into the ring, the ring had to be spaced a substantial distance below the ceiling; hence the first part was rather high, bulky and unsightly.

SUMMARY OF THE INVENTION

1. Purposes of the Invention

It is an object of the invention to provide a new and improved swivel suspension set.

It is another object of the invention to provide a swivel suspension set which easily can be attached to a ceiling, is firmly secured after attachment, and only can be removed by a lifting force and a subsequently applied horizontal force so that the grab cannot be dislodged accidentally.

It is another object of the invention to pivot a swivel suspension set with a mount of low height.

Other objects of the invention in part will be obvious and in part will be pointed out hereinafter.

BRIEF DESCRIPTION OF THE INVENTION

The swivel suspension set of this invention consists of two parts. The first part, a mount, is adapted to be attached to an overhead horizontal surface. The second part, a support, includes a grab means and is so secured to the first part as to permit rotation of the grab means about a vertical axis.

The first part comprises a base which is so structured that it can be attached solidly to a ceiling or the like. This conveniently is achieved by providing one or more through holes in the base to pass fasteners such as screws that will press the top surface of the base against the ceiling. The holes are so located that the heads of the screws are accessible and will not interfere with insertion and rotation of the second part. Although screws have been mentioned, any well-known form of fastening means can be used. The first part has pendant legs that support a split bearing in which the second part is rotatably mounted. The bearing constitutes a ring which is horizontally supported by the legs and is strong enough to support all loads that are within the designed range of use. The ring is gapped, i.e. slotted, for lateral introduction of the second part. The bore of the ring forms a squat bearing surface for rotatable reception of a cylindrical journal of the second part. A head is formed on the top of the journal. The head is larger than the journal so that it projects laterally beyond the same for at least a portion of the periphery of the journal. The head is seated on the upper surface of the ring, the under surface of the head bearing against the ring to limit downward movement of the grab means. The grab means which usually is a hook is attached to the bottom of the journal. The junction between the upper part of the grab and lower end of the journal has at least one dimension, e.g. the width of the upper end of the hook, which is smaller than the diameter of the journal and also smaller than the gap in the ring.

Each of the two parts is made in a single die casting operation with a zinc alloy.

The second part is assembled with the first part by aligning the upper end of the grab with the slot, orientating said upper end to present the narrow dimension athwart the width of the slot and sliding said upper end laterally through the slot until the journal is aligned with the bore in the ring. At this time the head and the journal are higher than the ring. Then the second part is dropped until the head rests on the upper surface of the ring and the journal is received in the ring. In this position, particularly with the grab supporting a load, the second part cannot be accidentally dissengaged from the ring and only can be removed first by lifting the second part and then by sliding the second laterally through the slot with the second part so angularly oriented that its narrow dimension is perpendicular to the slot.

The interlocking relationship of the two parts is made more secure by providing the second part with a protuberance that in all positions of the grab, except the one in which the narrow dimension is presented for sliding through the slot, protrudes beneath the under surface of the ring.

The preferred material used for die casting each of the parts as a single piece is a zinc alloy. A zinc alloy desirably is used due to its ease of casting and because it is resistant to shock and has a high tensile strength, a low shrinkage and good dimensional tolerances. Moreover it is easily plateable and, as cast, has a smooth surface that lends itself well to use as a bearing and as a journal. A typical useful alloy has zinc as the major component with about 4% of aluminum and about 1% of copper.

The die casting parts can be finished by tumbling.

The invention consists in the features of construction, combinations of elements and arrangements of parts which will be exemplified in the swivel suspension set hereinafter described and of which the scope of application will be indicated in the appended claims.

PREFERRED EMBODIMENT OF THE INVENTION

Figure 1:
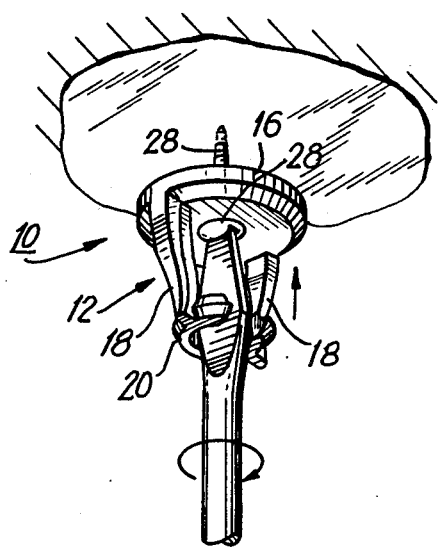
FIG. 1 is a perspective view of the mount being attached to a ceiling.

Referring now in detail to the drawings, reference numeral 10 denotes an overhead swivel suspension set constructed in accordance with the present invention. The set consists of two parts only. The first part is a mount 12; the second part is a support 14. Each of these two parts is made as a single piece composed of several united components. This permits each of the parts to be made with high speed, low cost, rapid, mass production equipment such as a molding machine. Thus the parts can be made from a material like a synthetic plastic resin for which an excellent method of production is injection molding. If the parts are made of a metal, such for instnace, as a zinc alloy, die casting is preferred method of manufacture. For commercial use the swivel suspension set desirably is made by die casting of a zinc alloy. The set can be used for any purpose that calls for the provision of an overhead swivel support, that is to say an overhead support that can rotate about a vertical axis. Typical purposes are the overhead support of a plant and the overhead support of an electric swag fixture.

The mount 10 is composed of three main components which are united into a single piece. One of the components is a base 16. Another component is a set of legs 18. The third component is a ring 20.

The base 16 may be of any desired configuration and may have an ornamental appearance. The base here shown is of simple shape, being in the outline of a circular disc with a chamfered lower edge. The top and bottom surfaces of the disc are horizontal. The top presents an effectively flat surface which is butted against a horizontal surface such as a ceiling.

Suitable means is included to secure the mount to an overhead surface. Such means conveniently constitutes a central through opening 24 which is reinforced by a squat sleeve 26 concealed within the hollow interior of the disc. Fastening means such as a screw 28 has its shank extended through the sleeve 24 and recieved in the ceiling. The head of the screw is beneath and bears against the bottom of the disc to force the disc against the ceiling. Other fastening means can be used in lieu of a screw, for example, a hollow wall fastener. Although a single opening and screw have been illustrated, it is with the ambit of the present invention to utilize plural fastening means. It only is important that the fastening means does not interfere with the operation of the swivel suspension set. Thus, if the set is intended to support a very heavy body, a few screws and corresponding holes should be provided.

Figure 3:
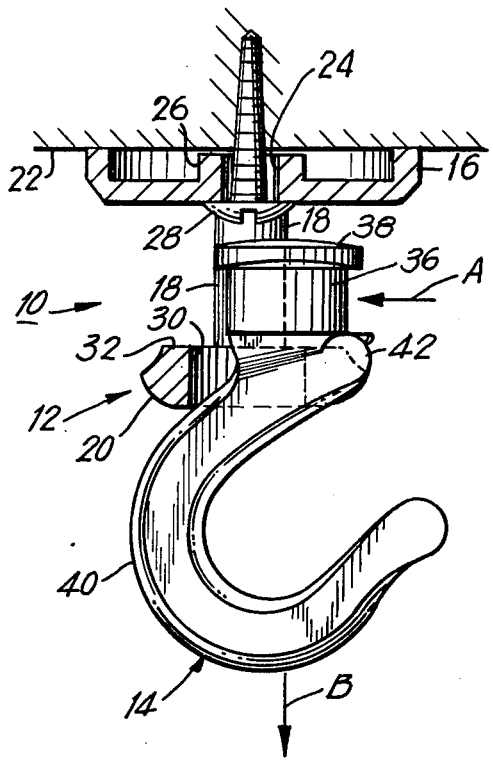
FIG. 3 is an enlarged axial sectional view of the swivel suspension set during assembly.
Figure 4:
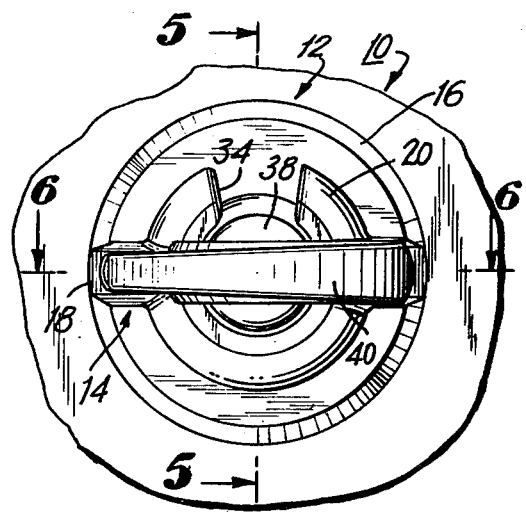
FIG. 4 is a bottom plan view of the swivel suspension set.
Figure 5:
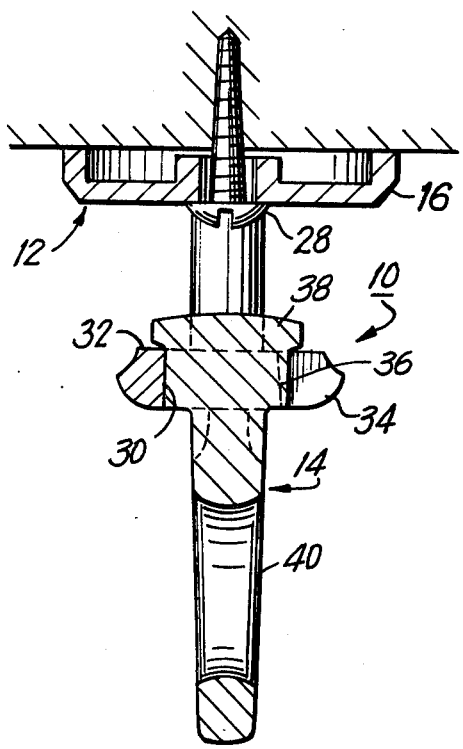
FIGS. 5 and 6 are sectional views taken substantially along the lines 5—5 and 6—6, respectively, of FIG. 4.

Extending downwardly from the disc 16, preferably from adjacent the periphery thereof, are the legs 18. The number of legs is not critical. A single leg may be used or two or more may be employed. In general, the number of legs will be governed by appearance rather than function. The only purpose of the legs is to hold the ring 20 securely. In the illustrated form of the invention, two legs are utilized, these being disposed at diametrically opposed points on the circumference of the disc 16 and diametrically opposed points on the ring 20. Two legs create a pleasant symmetrical appearance and do not interfere with proper operation of the set and provide an excellent support for the ring. If one leg is used, it will support the ring in a cantilever fashion. This may be esthetically undesirable although eminently utilitarian. The legs, for the sake of appearance, may converge downwardly and the ring in that event will be of a diameter smaller than that of the disc as shown in FIGS. 3 and 4.

The ring 20 is parallel to the disc 16 so that when the disc is juxtaposed against a ceiling in what is essentially a horizontal position, the ring 20 likewise will be horizontal. The opening through the ring is vertical and constitutes a rotary bearing 30. The top surface 32 of the ring constitutes a step bearing for the support 14.

Pursuant to a key feature of the present invention the ring is formed with a gap 35 which extends over an arc of considerably less than 180° so that it, in effect, provides a restricted lateral passageway between the inside and the outside of the ring. A typical arc is about 60° at the outside of the ring. The sides of the gap are substantially parallel but, for convenience of manufacture, the sides flare outwardly at a combined angle of about 10°. Preferably the gap is located midway between a pair of legs 18.

The support 14 includes a journal 36 of squat cylindrical configuration the axial length of which is a few hundredths of an inch more than the height of the ring to permit a slight vertical play between the mount and the support. The diameter of the journal is slightly less, e.g. about 0.04", that of the ring so that the journal can turn freely. The internal surface of the ring and the exterior surface of the journal have a smooth finish so that the journal does not bind in the ring when the support is turned.

Figure 6:
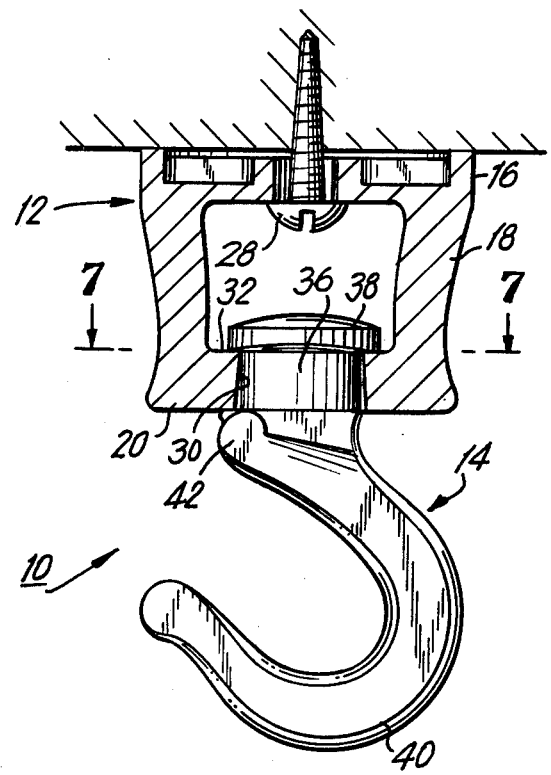
Figure 7:
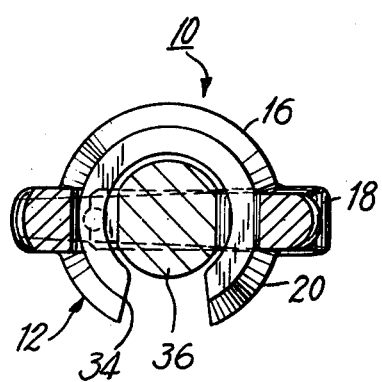
FIG. 7 is a sectional view taken substantially along the line 7—7 of FIG. 6.

The upper end of the journal has an enlarged head 38 which for the sake of appearance may be of circular configuration. The head projects laterally beyond the journal to provide a circular flange. This flange is intended to ride on the upper surface of the ring when the parts of the set are assembled so as to form a step bearing for the mount. The inner sides of the legs 18 are spaced inwardly from the bore 30 (see FIG. 6) in order to accomodate the head.

A grab 40, here shown in the shape of a hook, has its upper end integral with the lower end of the journal 36. The particular configuration of the hook will be governed by ornamental factors and by field requirements, that is to say, the mouth of the hook must be large enough to receive any chain with which the swivel suspension set is to be used and the hook must be heavy enough to carry the weight of a plant with which the hook is intended to be employed.

There are certain design features relating to the hook which constitute critical elements of the present invention. The primary feature is the dimensioning of the upper end of the hook which is the portion of the hook below the bottom of the journal 36. The height of said portion is at least equal to the height of the journal (the axial length of the journal). This portion of the hook must have at least one transverse dimension which is smaller than the width of the gap 34. By way of example with a gap width of one quarter inch, the hook at its upper end has a width of 0.20". If desired, and as shown, the entire hook is of a similar width, although this is not necessary. Another key feature which although not absolutely essential is most desirable is likewise related to dimensions and constitutes the formation of a protuberance 42 at the upper portion of the hook immediately below the journal in a direction transverse, e.g. perpendicular, to the transverse width dimension discussed above. This projection extends outwardly beyond the journal to form what constitutes a partial flange similar to the flange constituted by the head 38, but being incomplete. It is pointed out that the flange formed by the head 38 likewise may be incomplete as long as it rides on the upper surface of the ring and prevents the support from falling down through the ring after it has been assembled with the mount.

Figure 2:
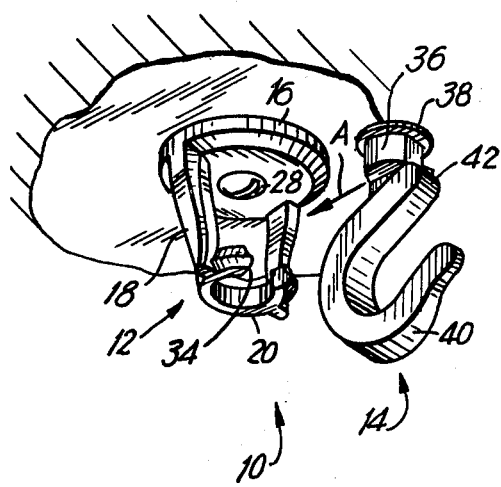
FIG. 2 is a perspective view of the support being assembled on the mount.

To use the set 10, it first is necessary to install the mount 12. To do this (see FIG. 1) the disc 16 is placed in a suitable location on a ceiling, beam or the like (see FIG. 3) and then an installer inserts a screw 28 through the sleeve 24 and turns the screw home, as with a screw driver. To connect the support to the mount, the support is held with the journal up and the hook down as shown in FIGS. 2 and 3. The journal is so positioned that the lower end of the journal is slightly above the upper surface of the ring and the hook is aligned with the gap 35. The support is so angularly turned as to align the narrow dimension of its upper end with the gap. Thereupon the support is moved toward the mount as indicated by the arrow A in FIGS. 2 and 3. Due to the positioning and axial orientation of the support, it can be slid through the gap in a horizontal direction. This motion is continued until the journal is above and aligned with the bearing 30. Next the support is moved downwardly as indicated by the arrow B in FIG. 3. This can be accomplished manually. The two parts now are assembled and the operation might be considered complete; however it is desirable furthermore to rotate the mount so as to face the hook in any angular position the user desires. This last rotation will bring the protuberance 42 beneath and in close proximity to the under surface of the ring 20.

With the two parts thus assembled, it will be appreciated that the support cannot be accidently uncoupled from the mount. Thus, if the support is jolted so as to tend to move it in any horizontal direction it will not be able to leave the ring since the journal prevents any transverse movement of the support. The journal is larger than the gap 34 and hence cannot shift horizontally out of it. Moreover if the support is jolted upwardly it will not leave the mount since movement of the support in a vertical upward direction is prevented by abutment of the protubance 42 against the under surface of the ring 28. The only way that the two parts can be disassembled from one another is to turn the hook 40 until its smaller tranverse dimension is aligned with the width of the gap 34 and then to lift the support. The proturbance 42 can move upwardly through the gap only at such time of alignment. Lifting is carried out until the journal is clear of the bore 30, after finally the support is moved laterally away from the mount. At this time the journal travels over the ring, and the protuberance and the upper portion of the hook travel laterally through the gap.

It is pointed out that the above described structure permits the fabrication of an assembled overhead swivel suspension set of squat dimension and particularly of a mount having a considerably reduced height in comparison with previous sets of this character. This is particularly important when the grab is uncoupled from the mount at which time it is desirable to have the mount appear as inconspicuous as possible. Because the support only has to be lifted a slight distance with respect to the ring during uncoupling the ring can be located close to the disc; the total height of the mount consists of the height of the disc, the height of the ring and the space between the ring and the disc.

It thus will be seen that there has been provided a swivel suspension set which accomplishes all of the objects of the present invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. An overhead swivel suspension set consisting of:
   (A) a mount and
   (B) a support,
   (C) said mount including
      (i) a base,
      (ii) a ring below the base, the top surface of the ring constituting a step bearing,
      (iii) legs connecting the ring to the base,
      (iv) the base being securable to an overhead horizontal surface so as to hold the ring in horizontal position,
      (v) the base, the legs and the ring being molded as a single piece,
      (vi) the ring having a radial gap the width of which is less than the diameter of the opening through the ring,
   (D) said support including
      (i) a journal,
      (ii) a head at the upper end of the journal, the head projecting laterally beyond the journal to provide a circular flange,
      (iii) a grab at the lower end of the journal,
      (iv) the diameter of the journal being greater than the width of the gap,
      (v) the upper end of the grab below the journal having at least one lateral dimension which is smaller than the width of the gap over a vertical distance at least equal to the height of the ring,
      (vi) the journal, the head and the grab being molded as a single piece,
   (E) whereby in order to assemble the support to a mount secured to an overhead horizontal surface, the support is held alongside the gap with the journal vertical and at a level higher than the ring and with the said lateral dimension of the upper end of the grab registering with said gap and perpendicular to the sides thereof, after which the support is moved with respect to the mount with said lateral dimension of the grab passing through the gap until the journal is located above the ring, and the support then is lowered until the journal is received within the opening in the ring and the head at the upper end of the journal rests against the top surface of the ring.

2. A set as described in claim 1 wherein the journal is at least as high as the ring.

3. A set described in claim 2 wherein the support includes a lateral projection at the lower end of the journal, said projection extending beyond the journal so as to lower surface of the ring and thereby limit upward movement of the support when said lateral dimension is out of registration with said gap.

4. A set as described in claim 1 wherein the grab is a hook.

5. A set as described in claim 1 wherein the mount and the support are a die cast zinc alloy.

6. A set as described in claim 1 wherein the mount constitutes two legs the lower ends of which are attached to diametrically opposite points on the ring.

7. A set as described in claim 1 wherein the vertical distance between the upper surface of the ring and the lower surface of the base is approximately equal to the axial length of the journal plus the thickness of the head.

* * * * *